UNITED STATES PATENT OFFICE.

ROBERT P. LEONARD, OF KEENE, NEW HAMPSHIRE.

IMPROVED PREPARATION FOR RAISING BREAD.

Specification forming part of Letters Patent No. 89,320, dated April 27, 1869.

I, ROBERT P. LEONARD, of Keene, in the county of Cheshire and State of New Hampshire, have invented a new and useful composition of matter, and the process of making the same, which I denominate "Hop-Yeasted Flour," to be used in the manufacture of bread; and I do hereby declare that the following is a full and exact description thereof, and the process of making the same, and the manner in which it is to be used in the manufacture of bread.

In my composition I combine four different ingredients, namely—the meal (by which term I mean the entire ground products without bolting) of any kind of grain, except India wheat, the flour of wheat, hops, and bicarbonate of soda. The hops may be left out of the composition, as hereinafter mentioned, if desired.

The manner or process by which I make or compound my hop-yeasted flour is as follows, namely: I first take the raw meal of any kind of grain, except India wheat, and mix it with water to the consistency of a thick batter. I then leave the batter in that condition three or four days, to ferment and sour. As soon as a thorough fermentation has taken place, I rinse the fermented batter or meal with pure water until all the acidity produced by the fermentation is extracted from the fermented mass and transferred to the water. I then reduce this water, thus acidulated, by evaporation (the quickest method to effect which is by boiling slowly) to nearly one-half in quantity. I then thicken with wheat-flour this acidulated water, thus reduced in quantity by evaporation, to the consistency of a thick batter, which I leave to ferment until it becomes acidified. Then, if it is desired to have hops in the compound, I steep one-half ounce of hops in one quart of water, and add one fluid ounce of the decoction to about three pounds of the acidified batter. I then immediately thicken the batter with wheat-flour to the consistency of a pie-crust dough. I then knead and roll this dough into thin sheets and hang them upon poles or pins to dry. When thoroughly dried I take the dough from the poles or pins and crush it for grinding, which I have done in a common French burr-stone mill, and after it is ground I have it bolted. Then to this product, after having been bolted, and which, in that state, I call "yeasted flour," I add bicarbonate of soda, in the proportion of from one-tenth to one-third, by weight, of the bicarbonate of soda to the yeasted flour, according to the acidity of the latter. The quantity of the soda to be added to the flour is to be determined by the taste and judgment of the operator. It should be sufficient to neutralize the acidity of the yeasted flour when the same is used in making bread. The composition thus prepared may then be put up for use.

If it is not desired to mix up the decoction or extract of hops in the composition of the yeasted flour above described, it may be left out, the process, in preparing the composition, being the same as above described, with the exception of the hops.

The best method which I have discovered or tried for using my hop-yeasted flour in making bread or biscuit is by adding it in the proportion of one tea-spoonful to a quart or pound of flour, both in a dry state, and mixing them by sifting or otherwise. Then mix the dough with cold milk or cold water, in the usual manner, and bake at once.

My compound, prepared as above described, is believed to be healthier and cheaper than any other known preparation of a like nature and for a like purpose.

Having above described my new composition, and the process by which I prepare it, and the manner in which it is to be used, what I claim, and desire to secure by Letters Patent, is—

A composition or yeast for making bread, compounded of the ingredients and prepared in the manner substantially as above set forth, with or without the use of hops.

ROBERT P. LEONARD.

Witnesses:
LEONARD WELLINGTON,
F. A. CRAIG.